United States Patent [19]

Fritzsche et al.

[11] 3,876,985

[45] Apr. 8, 1975

[54] MATRIX OF AMORPHOUS ELECTRONIC CONTROL DEVICE

[75] Inventors: Hellmut Fritzsche, Chicago, Ill.; Stanford R. Ovshinsky; Robert F. Shaw, both of Bloomfield Hills, Mich.; Marvin Silver; Pavel Smejtek, both of Chapel Hills, N.C.

[73] Assignee: Energy Conversion Devices, Inc., Troy, Mich.

[22] Filed: July 9, 1973

[21] Appl. No.: 377,750

Related U.S. Application Data

[60] Continuation-in-part of Ser. No. 139,004, April 30, 1971, abandoned, Division of Ser. No. 184,179, Sept. 27, 1971, Pat. No. 3,748,501.

[52] U.S. Cl. .................................. 340/166 R; 357/2

[51] Int. Cl. .......................... H03k 3/26; H03k 19/08

[58] Field of Search ............. 340/166 R; 307/299 R; 357/2

[56] References Cited

UNITED STATES PATENTS

| | | | |
|---|---|---|---|
| 3,423,605 | 1/1969 | Jensen | 357/2 X |
| 3,675,090 | 7/1972 | Neale | 357/2 |
| 3,748,501 | 7/1973 | Fritzsche et al. | 307/299 |

*Primary Examiner*—Donald J. Yusko
*Attorney, Agent, or Firm*—Wallenstein, Spangenberg, Hattis & Strampel

[57] ABSTRACT

A control device matrix comprising: a two dimensional array of conductive elements crossing one another but insulated at a plurality of points, current control device adjacent each of said points and each including electron emitting means disposed between the elements at the points and electrically connected with at least one of the conductive elements thereat and a discrete body of normally insulative switch-forming amorphous semiconductor material at each of said points. Primary circuit means are provided defining discrete circuit paths through the body of said switch-forming amorphous semiconductor material of each current control device. Circuits are provided for selectively actuating the electron emitting means of each current control device to selectively switch the bodies to a more conductive state by injecting high energy charge carriers into the bodies.

5 Claims, 8 Drawing Figures

MATRIX OF AMORPHOUS ELECTRONIC CONTROL DEVICE

This application is a continuation-in-part of application Ser. No. 139,004 filed Apr. 30, 1971, abandoned, entitled "Multi-Terminal Amorphous Electronic Control Device", and a division of application Ser. No. 184,179 filed Sept. 27, 1972, now U.S. Pat. No. 3,748,501.

This invention relates to electronic control devices and matrices thereof and particularly to three-terminal control device matrices having principal parts thereof made of an amorphous semiconductor material.

It is well known that electronic control devices such as transistors and diodes may be fabricated from crystalline semiconductor materials such as germanium, silicon, and gallium arsenide. It is commonly thought that the ability of these materials to conduct an electrical current is a function of the number of free electrons in their atomic structures. Semiconductor materials, thus, have more free electrons in their atomic structures than insulators such as glass and other amorphous materials. Semiconductors have fewer free charge carriers than conductors such as silver, copper, gold and other metals.

To fabricate an electronic control device the crystalline semiconductor material is "doped" or alloyed with impurities which do not combine perfectly with the semiconductor lattice structure. Thus, doping enlarges the free-charge carrier population in the material by creating more free electrons or, alternatively, scattered absences of valence electrons normally called "holes". Moreover, material having free holes is joined with a material having free electrons to form a p-n junction, across which the flow of electrons can be controlled. A three-terminal control device fabricated from crystalline semiconductor material requires at least two such junctions.

It has also been shown experimentally that the conductance of a noncrystalline, amorphous material may be increased by directing an electron beam against a body of such material while impressing a potential across the body. This approach to conductance control generally requires an evacuated environment for the amorphous body and a separate electron source. Moreover, the emission of electrons from the source into the evacuated space between the source and body requires relatively large quantities of energy.

It has also been shown that current flow through an amorphous semiconductor device may be controlled by a control electrode which is in intimate contact with the amorphous device; see for example the U.S. Pat. No. to S. R. Ovskinsky 3,336,486. The devices disclosed in that patent operate on the principle of a control current flow through the device and, thus, the control electrode is electrically in circuit with the primary current path through the device.

According to the present invention, at each crossover point of an X–Y axis matrix an electronic control device is provided which: (1) employs an amorphous, rather than crystalline, semiconductor material in a body defining a primary current path; thus, eliminating the requirement for p-n junction pairs in the body; (2) places the control instrumentality in intimate contact with the semiconductor body, thus, eliminating the spaced electron source and evacuation requirements of prior art devices; and (3) performs the modulation of primary path current flow by charge carrier injection whereby the control instrumentality is electrically separate from the primary current path.

In general, each control device comprises a body of amorphous semiconductor material defining a primary current path and a control means in intimate contact with the body but electrically separated from the primary current path for controllably injecting energetic or "hot" electrons into the body under relatively low power conditions for controlling the conductance of the body through the primary current path. Accordingly, a three or more terminal control device is provided which is capable of conveniently and expeditiously performing many control functions as hereinafter described.

The amorphous semiconductor body of the present invention may be fabricated from various materials including many, if not all, of those set forth in the U.S. Pat. No. to S. R. Ovshinsky, 3,271,591, issued September 6, 1966. These materials include "threshold materials" i.e., those in which a rapid change in conductance occurs at a particular value of applied voltage, field, temperature, radiation level, etc. Such materials include compositions of (a) 25 percent (atomic) arsenic and 75 percent a mixture of 90 percent tellurium and 10 percent germanium; (b) 40 percent tellurium, 35 percent arsenic, 18 percent silicon, 6.75 percent germanium, and 0.25 percent indium; and, (c) 28 percent tellurium, 34.5 percent arsenic, 15.5 percent germanium and 22 percent sulfur. The body many also be fabricated from "memory materials", i.e., those which experience a rapid change in conductance at some relatively well defined threshold as described above and in which the transition is accompanied by an internal transition from the amorphous state to a more ordered internal state, the latter state be retained after the removal of the influencing quantity. Such memory materials may be reversibly switched to the original state by a current pulse as more fully explained in the Ovshinsky U.S. Pat. No. 3,271,591. The threshold material devices require a "holding current" of some minimum value after the transition to the high conductance state has occurred in order to remain in that state, whereas the memory material devices do not. Examples of memory material compositions are (a) 15 percent (atomic) germanium, 81 percent tellurium, 2 percent antimony, and 2 percent sulfur; and, (b) 83 percent tellurium and 17 percent germanium.

While the threshold and memory materials mentioned above provide useful operating characteristics when operated in such a fashion as to take advantage of the unique qualities thereof, it is to be understood that the invention is not limited to the use of such materials; compositions having neither threshold nor memory characteristics may be advantageously employed. Examples of such materials are arsenic trisulfide and arsenic triselenide. Moreover, materials which do possess the threshold or memory characteristics may nonetheless be operated within ranges which do not bring those characteristics into effect.

In a preferred form, each control device is fabricated as a multilayer device comprising a thin film of amorphous material sandwiched beteen first and second inner and outer primary electrode layers to form a primary current path through the amorphous material. The multilayer structure further includes an electron injection structure such as a cold cathode diode or a reverse-biased p-n junction which is interfaced with the amorphous material through the inner primary electrode such that the electron injecting diode is completely external to the primary current path through the amorphous material. The cold cathode diode may, for example, comprise adjacent thin layers of a metal sometimes referred to as an electron emitting electrode and an insulator, the insulator being between the inner primary electrode which interfaces the diode with the amorphous material and the emitting electrode electron. A control voltage source is applied across the latter electrode and the inner primary electrode to impress an electron accelerating field across the diode. In this manner electrons are caused to be accelerated from the electron emitting electrode and to traverse the insulator material and through the primary electrode into the amorphous material where they exist for a time in an energetic or "hot" state. Although the utility of the control device is not to be predicated upon the correctness of this theory, it is believed that the energetic electrons injected into the amorphous material cause an increase in the charge carrier flow thereby modulating the bulk conductance of the amorphous material. Furthermore, the injected charge carriers may also cause such transformations in polymeric systems of organic and inorganic materials as: ring to chain conversions, long chain to short chain conversions, donor acceptor pairing, polymerization or chain attachment, chain packing, elastomeric flow changes accompanied with heating effect inputs, folding, crystallization, and other configurational and conformational changes, thus, to affect electrical conductivity.

As set forth in the above-mentioned U.S. Pat. No. 3,271,591, to S. R. Ovshinsky as well as U.S. Pat. No. 3,461,296, also in the name of S. R. Ovshinsky and issued on Aug. 12, 1969, materials usable in the present invention exhibit a sensitivity to electromagnetic fields, radiation at various wavelengths, temperature and applied voltage sensitivity. Therefore, the devices which are hereinafter set forth may be operated in a variety of ways and a variety of applications to respond to one, two, or more different energy or intelligence sources, thus, to represent logic devices and other devices for responding to multiple influences of divers character.

In accordance with the invention, a matrix of the above described control devices is provided comprising an array of insulated conductive elements crossing one another at a plurality of points. A control device as described is located at each point with the electron emitting electrode and the inner primary electrode connected between the conductive elements at each of said points. A load circuit is formed across the inner and outer primary electrode of each control device.

The various features and advantages of the present invention will become more apparent upon reading of the following specification which sets forth illustrative embodiments of the invention and which is to be taken with the accompanying drawings of which:

Figure 1:
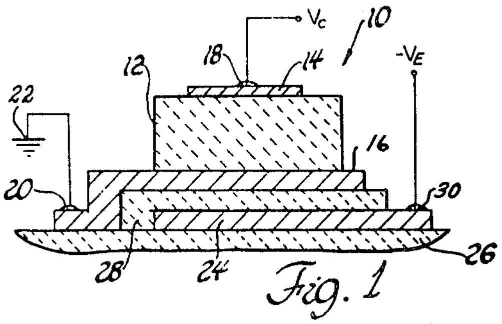
FIG. 1 is a sectional view of a control device embodying the invention.

Referring now to FIG. 1, there is shown a multilayer electronic control device 10 comprising a film 12 of normally amorphous insulative material having a conductivity threshold characteristic, as hereinafter described, and being disposed between deposited outer and inner primary electrodes 14 and 16. The electrodes 14 and 16 are substantially parallel to one another and enclose therebetween substantially the entire bulk of the amorphous film 12. Although aluminum may be a preferred material from which to fabricate electrodes 14 and 16, other materials having good conductivity and a relatively long mean-free path to hot electrons, such as molybdenum, may also be employed, the long mean free path requirement applying only to electrode 16. The thickness of electrode 16 is approximately 75 to 200 angstrom units whereas the thickness of the amorphous film 12 may be on the order of 100 times this dimension.

Primary electrodes 14 and 16 define a primary current path through the normally amorphous insulative film 12 which path may be switched between a highly resistive state and a highly conductive state as is more fully set forth in the above-mentioned U.S. Pat. No. 3,271,591, to S. R. Ovshinsky. The primary electrode 14 has affixed thereto a terminal 18 which, for the purpose of illustrating the operation of the device 10, is connected to a positive voltage source. The primary electrode may be designated as the collector of the device 10. The inner electrode 16 is fabricated so as to extend laterally beyond the boundaries of the film 12 to permit the connection to a terminal 20. This terminal and, thus, the inner primary electrode 16 is connected to a point 22 of reference potential such that the normal flow of current through the film 12 is from the collector 14 to the primary electrode 16 which may be referred to as the base or control electrode of the device 10.

Device 10 further comprises a means for injecting energetic electrons into the amorphous film 12. in FIG. 1 this electron injecting means is in the form of a cold cathode diode including a film 24 of aluminum which is deposited on an insulative substrate 26. Between the aluminum film 24 and the base 16 is a thin film 28 of an insulative material such as aluminum oxide. The aluminum film 24 is connected by means of a terminal 30 to a negative voltage source and is hereinafter referred to as the emitter of the device 10.

With the collector 14, base 16, and emitter 24 of the device 10 connected to the potentials indicated in FIG. 1, a field is impressed across the cold cathode diode comprising the aluminum film or emitter 24 and the insulator film 28 to cause the acceleration of electrons from the aluminum film 24 which acts as an electron source material toward the base electrode 16. Because the insulative layer 28 is thin, on the order of 75 to 200 angstrom units, a certain percentage of the energetic electrons which are emitted from the aluminum layer 24 traverse the insulative layer 28, and pass through the thin base 16 to the amorphous material film 12. The electrons which enter the amorphous film 12 are hot electrons, that is, they exist in an energetic condition which is out of energy equilibrium with the balance of the amorphous film 12. The injection of these energetic electrons into the amorphous film 12 significantly increases the charge carrier population and produces a marked increase in the conductance of the amorphous film between the primary electrodes 14 and 16. This effect decays as the negative emitter potential is removed, the rate of decay being temperature dependent. Within the scope of the explanation just given, the device 10 of FIG. 1 may represent an analog device, a threshold device, a memory device, or a device exhibiting a combination of such characteristics, depending upon the choice of materials for the film 12.

Figure 2:
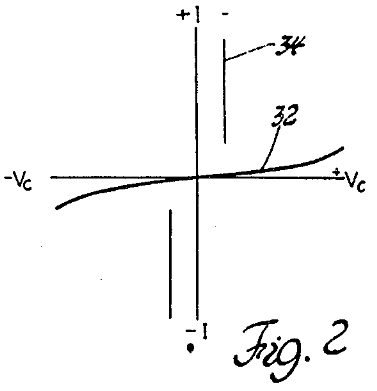
FIG. 2 is a graph of the collector current versus collector voltage of the device of FIG. 1 with a zero base voltage.

FIG. 2 shows thet typical current-voltage waveform of the device 10 of FIG. 1 where amorphous film 12 is made from a threshold material as aforementioned. It will be noticed from FIG. 2 that upon application of a potential across the amorphous film 12, the current increases along the curve 32 until a threshold voltage is exceeded at which time switching occurs and thereafter the current increases along a line 34. The curve of FIG. 2 indicates the bidirectional or symmetrical quality of the typical current-voltage relationship of the amorphous film 12 with a zero base bias. The current indicated in the ordinate of FIG. 2 is, of course, the primary current, that is, the current between the electrodes 14 and 16 of the device 10. When the device 10 of FIG. 1 is operated as a three terminal device by connection of the emitter electrode 24 to a negative voltage source, thus, to inject hot electrons into the amorphous material 12, the voltage current characteristic of FIG. 2 becomes asymmetrical, that is, depending on the magnitude of the emitter bias, the threshold or breakdown point between the curve portions 32 and 34 occurs at a lesser value of collector voltage in one direction than in the other. The emitter bias also tends to change the prethreshold Ic – Vc characteristic shown in FIG. 2. When the bias is made more negative, collector current is increased due to the increased injection of energetic electrons. Thus, the current Ic for a positive voltage Vc is increased and the switching threshold for positive Vc is decreased whereas the magnitude of Ic is decreased and the threshold level (voltage) increased for negative Vc. In a threshold material, the high conductance state is retained by a holding current; i.e., an Ic which is sufficient to prevent a reversal to the low conductance state. The electron injection process tends to reduce the level of Ic required to produce the holding effect for positive collector voltages. Conversely, electron injection increases the holding current requirement for negative collector voltages. A positive voltage $V_E$ does not inject electrons and is electronically equivalent to $V_E$ being zero.

In fabricating the device 10 of FIG. 1, it has been found advantageous to introduce charge barriers or, more accurately, blocking contact effects between the amorphous film 12 and the adjacent electrodes 14 and 16. The barrier between electrode 16 and film 12 operates as a block to low energy electrons which might traverse the electron-film junction and produce current flow in film 12 other than that produced by the charge carrier injection previously referred to herein. The barrier between electrode 14 and film 12 inhibits the flow of holes across the electrode-film junction which produce a backround current that is not affected by the injection process.

As will be apparent to those familiar with energy level diagrams, work functions and the like, the barriers referred to above prevent the entry into film 12 of respective negative and positive charge carriers by imposing a higher energy level requirement than that imposed by a purely ohmic contact arrangement. The barriers tend to increase the effective resistance of film 12 and enhance the current-flow-controlling effect of the charge carrier injection from source material layer 24. Barrier introduction may, for example, increase resistivity of film 12 from $10^4$ ohms to $5 \times 10^6$ ohms with no injection current and at room temperature.

The introduction of such barriers may be readily accomplished by any of several methods including merely air-aging the electrode 16 before depositing film 12 and similarly air-aging film 12 before depositing electrode 14. Alternatively, barrier introduction may be caused by admitting air, water vapor, nitrogen, or other gas to an otherwise evacuated sputtering chamber during the deposition of the layers of device 10. More specifically, the admission of the foreign substance occurs during the last few seconds of deposition of electrode 16 to form the electron barrier and again during the last few seconds of deposition of film 12 to form the hole barrier.

Figure 3:
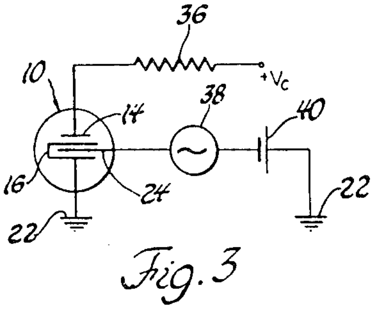
FIG. 3 is a schematic circuit diagram of an amplifier circuit employing the device of FIG. 1.
Figure 4:
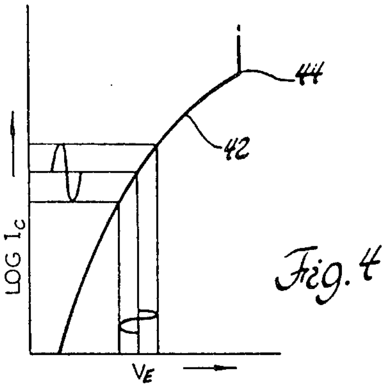
FIG. 4 is a plot of the gain characteristic of the circuit of FIG. 3.

The schematic diagram of FIG. 3 illustrates the interconnection of the device 10 as a emitter biased amplifier which may operate either in the control region or the switching region, the control region being the high resistivity part of the Ic – Vc characteristic within the threshold of a switching material. In FIG. 3 the collector electrode 14 of the device 10 is connected through a load resistor 36 to a positive supply and the electrode 16 is connected to a point of reference potential shown as ground 22. The control electrode 24 also called the emitter is connected through a small alternating voltage source 38 and a negative emitter bias source 40 to the ground point 22 as shown. Accordingly, the dc emitter bias minus $V_E$ biases the cold cathode diode in such a fashion as to produce high-energy electron injection into the amorphous film 12 but at such a level as to leave the amorphous film 12 in the region represented by curve 42 in FIG. 4. The alternating bias source 38 may, thus, produce the current amplification effect illustrated in FIG. 4 wherein the emitter voltage amplitude variation is compared with the log of the collector current waveform for a constant collector voltage. In this mode of operation the switching threshold of the device 10 is not exceeded over the portion 42 of the illustrated curve. If the injected current is effective to reduce the switching threshold to a value of Vc below that realized in the circuit of FIG. 3, the operation of the device is rapidly switched to the portion 44 of the curve shown in broken lines to indicate the rapid increase in collector current. As will now be apparent, all threshold and memory materials operated below threshold and non-switching materials such as those previously identified as examples herein may be employed to generate the characteristic represented by portion 42 of the curve of FIG. 4.

Figure 5:
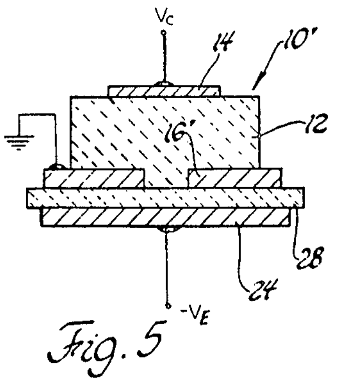
FIG. 5 is a sectional view of a control device exhibiting a structural modification relative to the FIG. 1 device.

FIG. 5 shows an alternative construction of the device 10′ wherein the primary electrode 16′ is formed with a central discontinuity such as a hole or cut to cause a small area of the amorphous film 12 to be directly adjacent the aluminum oxide insulator layer 28. In the area of the discontinuity, the injected charge carrier density is very high in the presence of thick electrodes 16'. This has the effect of speeding up the switching transition from the nonconductive to conductive state. The device 10' of FIG. 5 is otherwise similar to the device 10 of FIG. 1 and like components are identified with corresponding reference characters.

Figure 6:
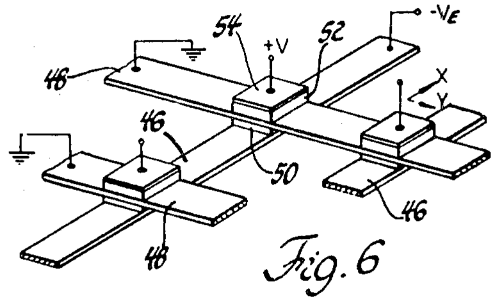
FIG. 6 is a perspective view of a representative portion of a two-dimensional array of control devices.

FIG. 6 illustrates the application of the control device described to a matrix constituting the present invention wherein an X–Y grid of two-dimensional character is formed by extending the aluminum emitter layer 46 in the form of an elongated strip in the X direction and extending the base electrode 48 in the form of an elongated strip in the Y direction. Aluminum oxide layer 50 is disposed between the strips 46 and 48 at the inner section thereof and an amorphous film 52 is disposed immediately over the aluminum oxide film 50, but on top of the strip 48. An operative device is completed by establishing an upper electrode 54 which serves as a collector as indicated in FIG. 6. In FIG. 6 a plurality of strips 46 and 48 are disposed in spaced, two-dimensional relationship, that is, a plurality of strips 48 are disposed in parallel relationship with one another in one plane and a plurality of strips 46 are disposed in parallel relationship with one another in another plane. Operative devices comprising additional layers 50, 52, and 54 are disposed at the various intersections of the strips 46 and 48 to form a two-dimensional array of selectible devices each exhibiting the switching characteristics previously described. In this manner, a coincidence type selection technique can be effected by applying the negative and reference potentials to the strips 46 and 48 in "half select" amounts, thus, to select for switching only the device which occurs at the inner section of the particular strips 46 and 48. Other arrangements in two and three dimensional arrays will, of course, occur to those skilled in the art.

Figure 7:
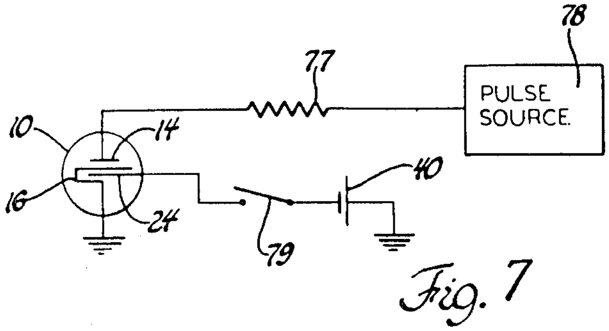
FIG. 7 is a schematic diagram of a current control device of the matrix with a voltage pulse source connected thereto.
Figure 8:
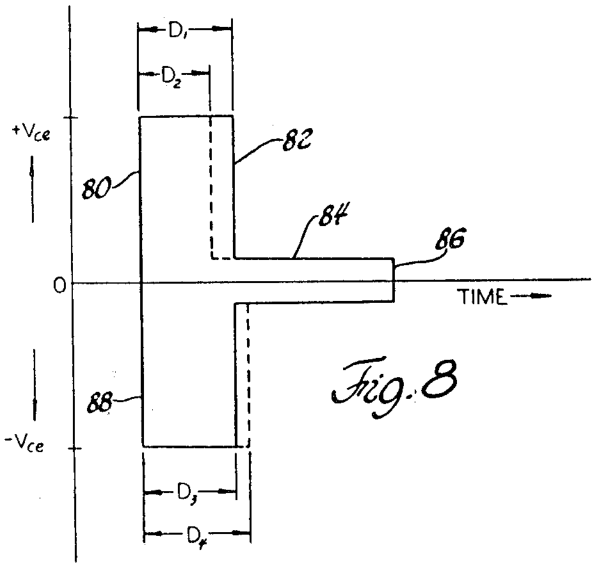
FIG. 8 is a graph illustrating the response of the control device to pulse inputs.

Referring now to FIGS. 7 and 8, the pulse input response of the various control devices previously described will be explained.

It has been assumed in the previous discussion pertaining to FIGS. 1–5 that the collector supply voltage applied to device 10 is constant rather than time varying and that the conductance of device 10 through the primary path between electrodes 14 and 16 is varied by varying the voltage applied to base electrode 24. FIGS. 7 and 8 demonstrate a variable with results from the application of collector voltage pulses to the device 10 from a pulse source 78 connected to collector electrode 14 through load resistor 77. Operation is illustrated and described under various emitter voltage conditions as controlled by switch 79. The material for the semiconductor device 10 is assumed to be a threshold material.

In FIG. 8, the abscissa represents time while the ordinate represents the voltage on collector 14 relative to ground; i.e., the drop across electrodes 14 and 16. Assuming a zero emitter bias, upon application of a positive voltage pulse to collector 14 having a steep rise represented by portion 80 of the positive curve in FIG. 8, a delay $D_1$ occurs before the transition to the low conductance state in device 10 takes place. The transition occurs rapidly causing the collector voltage to follow portion 82 of the curve, the high conductance state being characterized by low voltage portion 84. The end of the voltage curve at point 86 occurs upon removal of the collector voltage.

With a negative voltage applied to emitter 24, the injection of electrons into the body 12 causes the transition to occur in a shorter time illustrated as delay time $D_2$. The illustrated comparison assumes equal collector voltages in both the $V_E = O$ and negative $V_B$ cases. Accordingly, the pulse response time modulation which results in the device 10 upon variation of the emitter bias permits pulse width modulation to be easily accomplished in an analog fashion.

The negative curve 88 of FIG. 8 obtains from the application of a negative collector voltage pulse and illustrates the transition delay $D_3$ which occurs in conjunction with a zero (or positive) emitter bias as compared with the transition delay $D_4$ which occurs in conjunction with a negative emitter bias. The difference between $D_1$ and $D_2$ is believed to be slightly greater than the difference between $D_3$ and $D_4$.

It is to be understood that the foregoing description is illustrated in nature and is not to be construed in a limiting sense.

The embodiments of the invention in which an exclusive property or privilege is claimed are defined as follows:

1. A control device matrix compising: a two dimensional, non-coplanar array of conductive elements crossing one another at a plurality of points, electron emitting means disposed between the elements at the points and being mutually in physical contact therewith, discrete bodies of amorphous, normally insulative material at said points and spaced from the emitting means by selected conductive elements, primary circuit means defining discrete paths through the bodies of amorphous material, and control means for selectively actuating the electron emitting means thereby to selectively switch the bodies to a more conductive state by injecting high energy charge carriers into the bodies.

2. The control device matrix of claim 1 wherein said electron emitting means and body of amorphous normally insulative material at each of said conductive element crossing points forming a current control device thereat with said amorphous body being a switch-forming semiconductor material, said primary circuit means defining discrete circuit paths through the bodies of said switch-forming semiconductor material, and said control means for selectively actuating the electron emitting means of a selected current control device selectively switching the associated amorphous semiconductor body to a more conductive state by injecting the charge carriers into the selected body.

3. The control device matrix of claim 2, wherein said discrete circuit paths at each of said crossing points extend between one of said conductive elements at the associated crossing a portion of which forms an electrode on one side of the associated amorphous body and an electrode on the opposite side of the same forming part of said primary circuit-forming means between which latter electrode and said one conductive element a source of voltage may be connected.

4. The control device matrix of claim 3 wherein said electrode on said opposite side of the body of amorphous semiconductor material at each of said points and said one conductive element on said one side thereof constitutes respectively outer and inner primary electrodes, and said electron emitting means is interfaced with said body of amorphous semiconductor material on the side of said inner primary electrode remote from the outer primary electrode, said electrode emitting means including an electron electrode, a thin insulating layer separating said electron emitting electrode from said inner primary electrode, said inner primary electrode being constructed to provide an electric field between it and said electron emitting electrode which causes electrons to flow from said electron emitting electrode and through said thin insulating layer to pass into said body of amorphous semiconductor material when a voltage of proper polarity is connected between said inner primary electrode and said electron emitting electrode.

5. The control device matrix of claim 4 wherein said control means includes a circuit for selectively applying a voltage between the associated electron emitting means and the inner primary electrode of a selected current control device.

* * * * *